United States Patent [19]

Mestdagh et al.

[11] Patent Number: 5,809,030
[45] Date of Patent: Sep. 15, 1998

[54] FREQUENCY DIVISION MULTIPLE ACCESS (FDMA) DEDICATED TRANSMISSION SYSTEM, TRANSMITTER AND RECEIVER USED IN SUCH A TRANSMISSION SYSTEM

[75] Inventors: Denis Julien Gilles Mestdagh, Brussels; Martin Louis Florence De Prycker, Sint-Niklaas, both of Belgium

[73] Assignee: Alcatel N.V., Rijswijk, Netherlands

[21] Appl. No.: 593,885

[22] Filed: Jan. 30, 1996

[30] Foreign Application Priority Data

Jan. 31, 1995 [EP] European Pat. Off. ............... 95200228

[51] Int. Cl.$^6$ ....................................................... H04J 1/00
[52] U.S. Cl. ........................... 370/480; 370/482; 370/483
[58] Field of Search ..................... 370/480, 482, 370/428, 485, 498, 503, 507, 319, 344, 321, 336, 337, 345, 346, 347, 330, 436, 468, 442, 443, 444, 484, 307

[56] References Cited

U.S. PATENT DOCUMENTS

| | | | |
|---|---|---|---|
| 5,228,025 | 7/1993 | Le Floch et al. | 370/484 |
| 5,323,255 | 6/1994 | Sierens et al. | 359/137 |
| 5,479,447 | 12/1995 | Chow et al. | 370/468 |
| 5,623,513 | 4/1997 | Chow et al. | 375/219 |
| 5,636,246 | 6/1997 | Tzannes | 370/480 |
| 5,644,573 | 7/1997 | Bingham et al. | 370/503 |

FOREIGN PATENT DOCUMENTS

| | | |
|---|---|---|
| 0512642 | 11/1992 | European Pat. Off. . |
| 0641096 | 3/1995 | European Pat. Off. . |
| 0616445 | 9/1994 | France . |

OTHER PUBLICATIONS

"TPON –A Passive Optical Network for Telephony" from J.R. Stern et al from the proceeding of ECOC '88, pp. 203–206.

European Transactions on Telecommunications and Related Technologies, vol. 4, No. 3, May, 1993, Milano, IT, pp. 257–266, P.S. Chow et al "A Multicarrier Ei–HDSL Transceiver System with Coded Modulation", p. 259.

Primary Examiner—Chi H. Pham
Assistant Examiner—Steven Nguyen
Attorney, Agent, or Firm—Ware, Fressola, Van Der Sluys & Adolphson LLP

[57] ABSTRACT

The demodulation of data modulated on a set of carriers with equidistant frequencies by a plurality of transmitters (T1 ... Tn) is executed in the present transmission system (TS) by a discrete multitone receiver (DMT-R). The transmitters (T1 ... Tn) in the transmission system (TS) modulate their data on subsets of carriers which form part of the set of carriers with equidistant frequencies. These transmitters (T1 ... Tn) are possibly additionally equipped with a cyclic prefix adder (CPA); synchronization between them is guaranteed if a predefined condition is fulfilled.

8 Claims, 3 Drawing Sheets

FREQUENCY DIVISION MULTIPLE ACCESS (FDMA) DEDICATED TRANSMISSION SYSTEM, TRANSMITTER AND RECEIVER USED IN SUCH A TRANSMISSION SYSTEM

TECHNICAL FIELD

The present invention relates to a frequency division multiple access (FDMA) dedicated transmission system, including a transmitter and a receiver used in same.

BACKGROUND OF THE INVENTION

Such a transmission system, transmitter and receiver are already known in the art, e.g. from the optical transceiver arrangement described in the published *European Patent Application EP*0512642, Sierens, Mestdagh & Van Der Plas, and corresponding U.S. Pat. No. 5,323,255. Therein, the receiver includes an electrical splitting means to split the received signal over m communication lines, where m is the number of frequencies used for the data carriers. Each split signal is demodulated by one of the demodulating means. The demodulated signals are then demultiplexed, if necessary, i.e. if they contain signals in different time slots, by well known time division demultiplexing circuits. The known receiver arrangement thus comprises for each carrier frequency the cascade connection of demodulating means and time division demultiplexing means. As a result, the complexity and correspondingly the cost of such a receiver grow linearly with the number of carrier frequencies used.

SUMMARY OF THE INVENTION

An object of the present invention is to provide a frequency division multiple access (FDMA) dedicated transmission system of the above known type but wherein the demodulation and demultiplexing can be performed by a less complex and accordingly more cost-effective receiver.

According to the invention, this object is achieved by means of the transmission system including a plurality of transmitters, a multipoint to point transmission medium and a receiver, each transmitter of said plurality of transmitters including, between an input and an output thereof, a modulating part that modulates input data, applied to the transmitter via the input, on a subset of carriers, the modulating part thereby generating a subset of modulated carriers for application to the transmission medium via the output, characterized in that the receiver is of a discrete multitone type and includes between an input and an output thereof, a demodulating part, that demodulates discrete multitone symbols modulated on a set of carriers with equidistant frequencies, and that the modulating part of each transmitter modulates the input data on a predetermined subset of carriers, which forms part of the set of carriers with equidistant frequencies.

It is also directed to a transmitter for use in a frequency division multiple access dedicated multipoint to point transmission system, the transmitter including between an input and an output thereof, a modulating part to modulate data bits of a data bit stream on a predetermined subset of carriers, characterized in that the subset of carriers forms part of a set of carriers with equidistant frequencies, and that the modulating part, coupled between an input and an output thereof, includes a cascade connection of a mapper, an inverse fast fourier transform processing unit and a parallel to serial converter, the mapper grouping the data bits according to predefined modulation methods for each carrier of the subset of carriers, thereby producing subgroups of data bits, and modulating each of the carriers with a respective one of the subgroups of data bits, thereby generating a subset of modulated carriers, the inverse fast fourier transform processing unit transforming the subset of modulated carriers from frequency domain to time domain and applying the subset of modulated carriers transformed to the time domain to the parallel to serial converter to be converted into a serial data stream for application to the output.

It is further directed to a receiver for use in a frequency division multiple access dedicated multipoint to point transmission system, the receiver including, between an input and an output thereof, a demodulating part to demodulate data modulated on a set of carriers by a plurality of transmitters and applied to the receiver via a multipoint to point transmission medium, characterized in that the data are modulated on a set of carriers with equidistant frequencies, and that the demodulating part, between an input and an output thereof, includes a cascade connection of a time domain equaliser, a serial to parallel converter, a fast fourier transform processing unit, a frequency domain equaliser and a demapper, the time domain equaliser to compensate impulse response effects of the transmission medium by digital filtering, the serial to parallel converter generating a parallel bit stream and applying the bit stream to the fast fourier transform processing unit to be transformed from time domain to frequency domain, the frequency domain equaliser compensating frequency dependent amplitude and phase distortion of the transmission medium also by digital filtering and the demapper retrieving the data from the set of modulated carriers according to predefined modulation methods for each carrier of the set of modulated carriers.

In this way, by using a receiver of a discrete multitone type, the complexity of the receiver grows logarithmically with the number of carrier frequencies used. If a large number of frequencies is used, the complexity of the receiver is reduced significantly when compared to the complexity of the known receiver.

Indeed, the complexity of the present receiver is mainly determined by the fast fourier transform processing unit thereof, and as is well known by a person skilled in the art, the complexity of such a unit grows logarithmically with the number of samples applied to its input. For discrete multitone symbols carried by a set of carriers, this number of samples applied to the input of the fast fourier transform processing unit is equal to the number of carriers in the set of carriers.

The discrete multitone symbols received by the receiver in the present transmission system contain data transmitted by the plurality of transmitters also included therein. Therefore, each transmitter is assigned a predetermined subset of carriers to modulate data on. These subsets all together constitute a set of carriers with equidistant frequencies, which is a requirement of the discrete multitone technique. Carriers used by different transmitters however, are generated by different carrier generators. Their frequencies will not be perfectly equidistant as a result of which the above subsets of carriers do not constitute a perfectly orthogonal set of carriers. A small frequency interference effect due to this non-orthogonality thus seems to be a penalty of the present transmission system. Nevertheless, this penalty is made negligible provided that the frequencies of the clocks of the distinct transmitters match within a specified range.

A first implementation of a transmitter according to the present invention is a transmitter of the discrete multitone type, modulating data on a subset of carriers with equidistant frequencies which forms part of the above set of carriers with equidistant frequencies.

A more simple implementation of the present transmission system is based on a plurality of transmitters, modulating each one single carrier out of the above set of carriers with equidistant frequencies, with e.g. a QAM modulation technique.

As will be described later, the modulation technique might even be different for each transmitter and for each carrier.

An additional characteristic feature of the present transmission system is that it includes time division multiplexing and demultiplexing means.

As already mentioned above, the known receiver, used in frequency domain multiple access (FDMA) transmission systems, comprises, when combining frequency division multiple access (FDMA) with time division multiple access (TDMA), for each carrier frequency a time division demultiplexing means. Therefore in an alternative embodiment, time division multiplexing and demultiplexing, allowing several transmitters to modulate data on carriers with equal frequencies, if these data are transmitted in different time slots, are integrated in the transmission system. Well known time division multiplexing means tuned by respective control units are therefore included in the transmitters, whilst a time division demultiplexing means, tuned also by a control unit, is included in the receiver. At the receivers side, for reasons already mentioned, the complexity of the time division demultiplexing means is restricted in an analogous way as for the demodulating means.

A further characteristic feature of the present transmission system is the inclusion of a plurality of delay units each of which is coupled between a respective one of the plurality of transmitters and the transmission medium, the delay units delaying transmission of the modulated carriers. This characteristic feature solves the problem of obtaining synchronization between the plurality of transmitters by compensating propagation delay effects due to different distances from each individual transmitter to the receiver.

Indeed, by including delay units which delay the transmission over a greater time period for transmitters at short distances to the receiver and vice versa, the distance from each individual transmitter to the receiver is virtually made equal.

A further characteristic feature of the present transmitter is where its modulating part includes a cyclic prefix adder, coupled between the inverse fast fourier transform processing unit and the parallel to serial converter so as to add a number of prefix bits to the subset of modulated carriers transformed to the time domain, the number of prefix bits being determined in such a way as to prevent the transmission system (TS) from interblock interference. This feature has the advantage of compensating interblock interference due to impulse response effects of the transmission medium.

Indeed and as is described in the article 'A Multicarrier E1-HDSL Transceiver System with Coded Modulation', written by Peter S. Chow, Naofal Al-Dhahir, John M. Cioffi and John A. C. Bingham and published in the issue Nr. 3 May/June 1993 of the journal *European Transactions on Telecommunications and Related Technologies* (*ETT*), pages 257–266, the effective length of the channel impulse response in a discrete multitone transmission system may cause interblock interference. To mitigate this interblock interference, the discrete multitone receiver is equipped with a time domain equalizer, which is in fact a short adaptive digital filter, and a cyclic prefix extension is added to the modulated symbols in a discrete multitone transmitter.

Still another characteristic of the present transmitter is where the number of prefix bits is enlarged with respect to the number of prefix bits determined to prevent the transmission system from interblock interference, thereby avoiding synchronization problems. This feature solves the problem of synchronization between the distinct transmitters without the use of the plurality of delay units.

Indeed, when adding a number of cyclic prefix bits to each block of data transmitted, the distances between respective ones of the transmitters and the receiver are allowed to differ over a range smaller than $(n.s)/(2.f)$ without synchronization problems, wherein n represents the number of cyclic prefix bits (in bits), s represents the propagation speed of the transmission medium (in meters per second) and f represents the number of bits transmitted each second (in bits per second).

From the above formula it is seen that these distances may differ over a wider range when the number of cyclic prefix bits, n, is enlarged. Enlarging the number of cyclic prefix bits is thus an alternative for the above described use of delay units.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
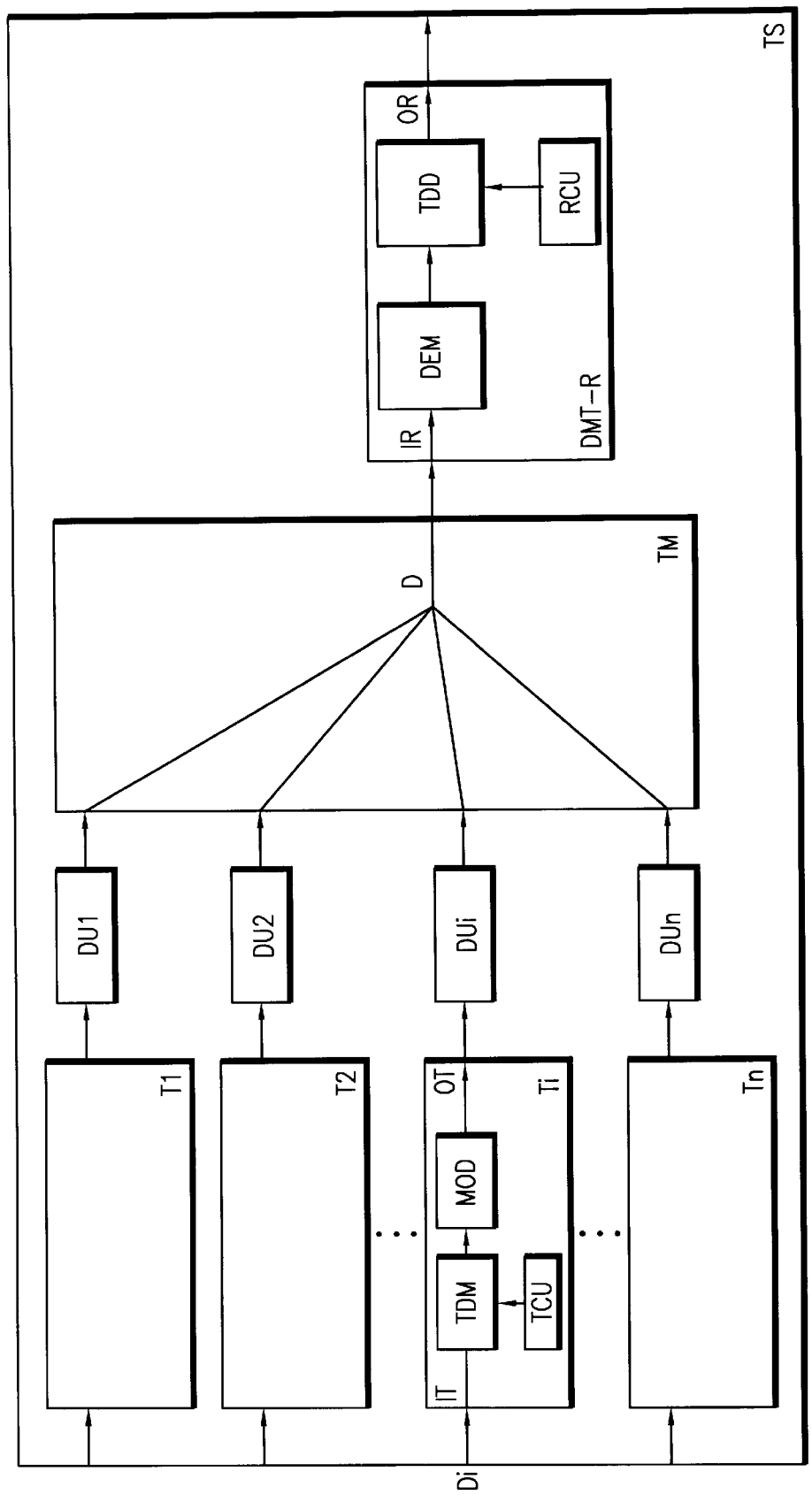
FIG. 1 is a schematic representation of an embodiment of a transmission system TS according to the present invention.

Referring to FIG. 1, an embodiment of a frequency division multiple access (FDMA) dedicated transmission system TS according to the present invention will be described.

This transmission system TS includes a plurality of transmitters T1 . . . Tn, a plurality of delay units DU1 . . . DUn, a multipoint to point transmission medium TM and a receiver DMT-R. Each transmitter, e.g. Ti of the plurality of transmitters T1 . . . Tn comprises a time division multiplex means TDM, a time division multiplex control unit TCU and a modulating part MOD, whilst the receiver DMT-R comprises a demodulating part DEM, a time division demultiplex means TDD and a time division demultiplex control unit RCU.

Outputs of respective ones of the transmitters T1 . . . Tn are coupled to access nodes of the multipoint to point transmission medium TM via respective ones of the delay units DU1 . . . DUn. Furthermore, an input IR of the receiver DMT-R is connected to the output node of the transmission medium TM.

In the following one transmitter, i.e. Ti, is described in further detail. However this description is equally well applicable to the other transmitters T1 . . . Tn.

Between an input IT and an output OT of transmitter Ti, the time division multiplex means TDM and the modulating part MOD are coupled in a series connection. Furthermore an output of the time division multiplex control unit TCU is connected to a control input of the time division multiplex unit TDM. In a similar way, a series connection of the demodulating part DEM and the time division demultiplex means TDD is coupled between the input IR and an output OR of the receiver DMT-R, whilst an output of the time division demultiplex control unit RCU is connected to a control input of the time division demultiplex means TDD.

The present transmission system TS is dedicated to frequency division multiple access (FDMA), which implies that the distinct transmitters T1 . . . Tn simultaneously transmit data via the transmission medium TM to the receiver DMT-R. Therefore, each of them is assigned a subset of carrier frequencies and correspondingly each of them has at its disposal a predetermined bandwidth capacity.

The receiver DMT-R according to the present invention is of a discrete multitone type and likewise demodulates discrete multitone symbols D modulated on a set of carriers with equidistant frequencies. If necessary, i.e. if equal carrier frequencies are assigned to different transmitters during different time slots, the receiver DMT-R splits the data transmitted by these different transmitters. The discrete multitone demodulation at the receivers side is performed by the demodulating part DEM, a particular embodiment of which will be described in further detail later on, whilst the time division demultiplexing is executed by the time division demultiplex means TDD. Thereto the time division demultiplex means TDD is controlled by control signals applied to its control input by the time division demultiplex control unit RCU. The technique of time division demultiplexing is well known in the art, e.g. from the article "*TPON—A Passive Optical Network for Telephony*" from J. R. Stern et al from the *Proceedings of ECOC '88*, pages 203–206. The time division demultiplex means TDD and its control unit RCU will therefore not be described in more detail.

To enable the transmission medium TM to apply discrete multitone symbols D to the receiver DMT-R, transmitter Ti is given access to the transmission medium TM and modulates data Di, applied to the input IT thereof, on a subset of carriers which forms part of the above set of carriers with equidistant frequencies. This modulation is performed by the modulating part MOD included in transmitter Ti.

Furthermore Ti is equipped with a time division multiplex means TDM, controlled by a time division multiplex control unit TCU, to assign time slots to data Di which are modulated on a carrier whose frequency is also used by another transmitter. Referring to the above cited article "*TPON—A Passive Optical Network for Telephony*", the time division multiplex means TDM and time division multiplex control unit TCU also will not be described in further detail here.

In a first implementation (not shown) of the transmitter Ti according to the present invention, the subset of carriers modulated consists of one single carrier on which all input data Di applied to this transmitter Ti are modulated, e.g. by QAM modulation. In an alternative embodiment of this transmitter Ti, the subset is constituted by carriers with equidistant frequencies, in which case the transmitter Ti, similar to the receiver DMT-R, is of a discrete multitone type. Such an embodiment will be described later on by means of FIG. 2. Still an alternative embodiment of the transmitter Ti (also not shown) even contains an arbitrary collection of carriers out of the set of carriers with equidistant frequencies. Each carrier of this collection is modulated using different modulation methods and thus carries a different number of databits. For example, transmitter T5 modulates carriers whose frequencies are equal to the second and fifth frequency out of the set of equidistant frequencies respectively, whereby the carrier whose frequency is equal to the second frequency is modulated by a 4-QAM modulation method and the carrier whose frequency is equal to the fifth frequency is modulated by a 16-QAM modulation method. The second carrier of the above set of carriers thus carries 2 bits when the fifth carrier carries 4 bits. Of course, the receiver DMT-R has to know which carrier is modulated by which transmitter and which modulation method is used thereto. Information of this kind is shared between the transmitters T1 . . . Tn and the receiver DMT-R when initializing the transmission system TS.

Finally, the transmission system TS of FIG. 1 includes, between transmitter Ti and the corresponding access node of the transmission medium TM a delay unit DUi. In the multipoint to point transmission system TS, the effective distances between respective ones of the transmitters T1 . . . Tn and the receiver DMT-R differ. Different distances however cause synchronization problems. Indeed, data which are transmitted simultaneously by different transmitters arrive at different instances at the receiver DMT-R. In the opposite direction, signals which are transmitted by the receiver DMT-R to enable or disable the transmitters to transmit data, are received by these transmitters at different instances of time. Therefore the delay units DU1 . . . DUn, delaying the transmission of data over a longer time period for transmitters which are closer to the receiver DMT-R, are included in the transmission system TS. The delays introduced by these delay units DU1 . . . DUn are introduced to obtain virtually equal distances from each transmitter T1 . . . Tn to the receiver DMT-R. The individual distances from these transmitters T1 . . . Tn to the receiver DMT-R therefore are measured at initialization of the transmission system TS.

An alternative technique to obtain synchronization between the transmitters T1 . . . Tn, based on prefix extension, will be described later.

Figure 2:
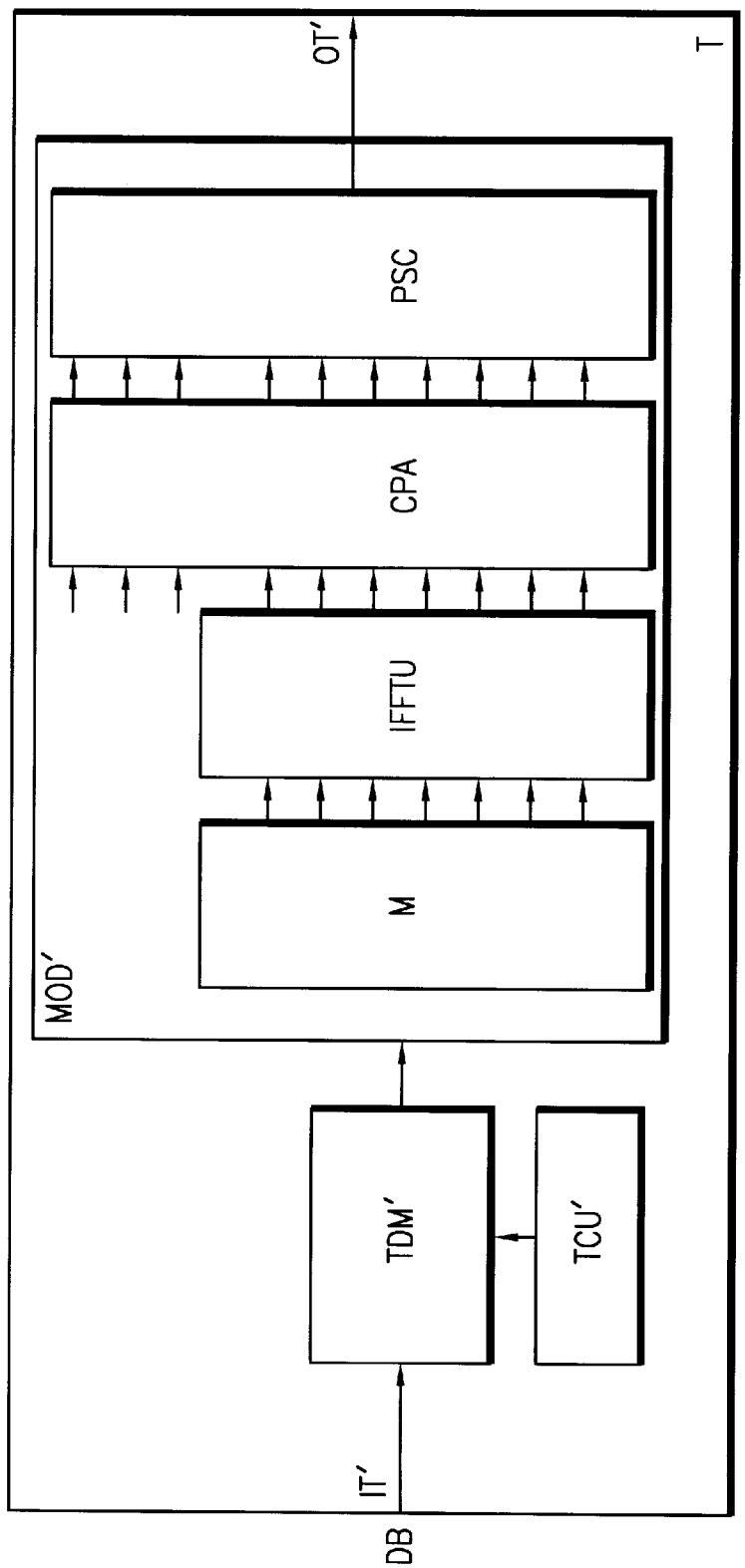
FIG. 2 is a schematic representation of an embodiment of a transmitter T according to the present invention.

Referring to FIG. 2, a transmitter T according to the present invention will be described and its working will be explained. This transmitter T is a particular embodiment of the transmitters T1 . . . Tn in the transmission system TS of FIG. 1.

The transmitter T of FIG. 2 modulates databits DB, applied to an input IT' thereof, on a subset of carriers with equidistant frequencies, which forms part of a set of carriers with equidistant frequencies.

The carriers modulated by the transmitter T constitute necessarily a subset of carriers with equidistant frequencies and therefore the transmitter T of FIG. 2 is only a particular example of the transmitters T1 . . . Tn shown in FIG. 1.

The transmitter T of FIG. 2 comprises a time division multiplex means TDM' and a time division multiplex control unit TCU', similar to those of the transmitter Ti in FIG. 1, and a modulating part MOD' including a mapper M, an inverse fast fourier transform processing unit IFFTU, a cyclic prefix adder CPA and a parallel to serial converter PSC.

The time division multiplex means TDM' and the modulating part MOD' are series connected between an input IT' and an output OT' of the transmitter T. An output of the time division multiplex control unit TCU' is connected to a control input of the time division multiplex means TDM'. Between an input and an output of the modulating part MOD', the mapper M, the inverse fast fourier transform processing unit IFFTU, the cyclic prefix adder CPA and the parallel to serial converter PSC are cascade connected.

The time division multiplex means TDM' and the time division multiplex control unit TCU' are known from the earlier mentioned article and thus will not be described in details.

Databits DB applied to the modulating part MOD' via the time division multiplex means TDM' are divided into subgroups of databits by the mapper M. As already mentioned, different carriers may be modulated by different modulation methods and thus may carry a different number of databits. The mapper M therefore generates subgroups of databits for each carrier to be modulated and modulates the carriers with their respective subgroups.

The modulated carriers are additionally transformed into a time domain sequence by the inverse fast fourier transform processing unit IFFTU.

Due to the effective length of the impulse response of the transmission medium TM, interblock interference can occur. As will be described later, interblock interference is compensated by an adaptive digital filter included in the receiver. In practical applications however, such a digital filter technique is usually combined with cyclic prefix extension to obtain complete compensation of interblock interference. In the present transmitter T, the cyclic prefix extension is performed by the cyclic prefix adder CPA. Each datablock to be transmitted is supplemented with n prefix bits whose values are equal to the values of n bits at the end of this datablock. In the extended datablock generated by the cyclic prefix adder CPA the first n bits thus are equal to the final n bits. In this way, fast fourier transformation executed on a block of bits, whose length is equal to the length of the non extended datablock and which is arbitrarily taken out of the extended datablock, will give similar results because the fast fourier transform is implicit periodically. The cyclic prefix extension performed by the cyclic prefix adder CPA is known from point to point discrete multitone applications but involves, when used in a multipoint to point environment, an additional advantage: synchronization between transmitters can be guaranteed if the condition that their individual distances to the receiver do not vary over a range greater than $(n.s)/(2.f)$ is fulfilled. In this formula n represents the number of cyclic prefix bits (in bits) added to each datablock, s represents the propagation speed over the transmission medium (in meters per second) and f represents the number of bits transmitted per time unit (in bits per second) from the distinct transmitters to the receiver. In the following, this will be proved.

Consider for example in a transmission system TS as is drawn in FIG. 1, a first transmitter T1 and a second transmitter T2 at distances d1 and d2 from the receiver DMT-R respectively, and suppose both transmitters, T1 and T2 to be of the type of the transmitter T shown in FIG. 2. A datablock A transmitted by transmitter T1 and a datablock B transmitted by transmitter T2 need to arrive synchronously at the receiver DMT-R, to form part of the same discrete multitone symbol D. The receiver DMT-R previously transmits a control signal to both the first and second transmitter, T1 and T2, to make them transmit their datablocks, A and B respectively. After receipt of this control signal both transmitters, T1 and T2, start transmitting their respective datablocks A and B. Suppose d2 is a greater distance than d1. Consequently the transmitting of datablock B will be delayed with respect to the transmitting of datablock A because the control signal has to travel a longer distance before it arrives at the second transmitter T2. At the receiver DMT-R, the delay of datablock B with respect to datablock A will be enlarged because datablock B also has to cover the longer distance d2. If s represents the propagation speed of the transmission medium TM (in meter per second), the arrival at the receiver DMT-R of datablock B will be delayed over a time period $(d2-d1).2/s$ with respect to the arrival of datablock A. If this delay is smaller than the time needed to transmit the cyclic prefix bits added by the cyclic prefix adder CPA of transmitter T1 to datablock A, full synchronization is still maintained. If f represents the number of bits transmitted per time unit (in bits per second) and n represents the number of prefix bits added to datablock A (in bits), then the time needed to transmit the cyclic prefix bits of datablock A is given by n/f. Thus, the condition to obtain synchronization is given by the inequality:

$$(d2-d1).2/s <= n/f$$

which can be rewritten as:

$$d2-d1 <= (n.s)/(2.f)$$

Summarizing, if n cyclic prefix bits are added to each datablock, no synchronization problems should be foreseen as long as the distances from the transmitters T1 ... Tn to the receiver DMT-R do not vary over a range greater than $(n.s)/(2.f)$. Taking into account this condition, enlarging the cyclic prefix extension can be an alternative technique to avoid the use of the above mentioned delay units DU1 ... DUn.

Finally, referring again to FIG. 2, the extended datablocks are applied to the parallel to serial converter PSC which generates a serial data stream that can be applied to the transmission medium TM via the transmitter output OT'.

Figure 3:
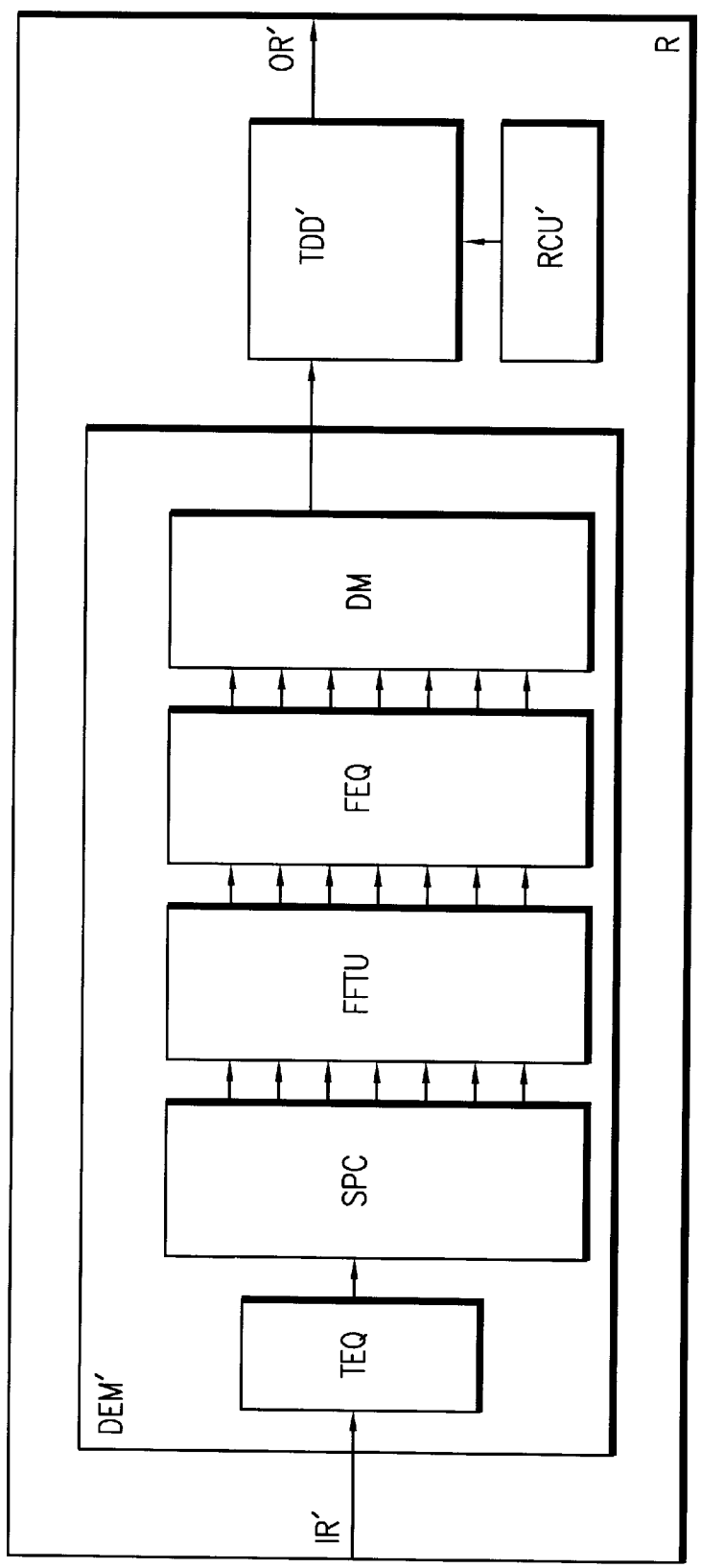
FIG. 3 is a schematic representation of an embodiment of a receiver R according to the present invention.

FIG. 3 shows an embodiment of a receiver R of a discrete multitone type, according to the present invention. This receiver R is a particular embodiment of the receiver DMT-R, included in the transmission system TS of FIG. 1.

The receiver R in FIG. 3 includes a demodulating part DEM', a time division demultiplex means TDD' and a time division demultiplex control unit RCU'. The demodulating part DEM' consists of a time domain equalizer TEQ, a serial to parallel converter SPC, a fast fourier transform processing unit FFTU, a frequency domain equalizer FEQ and a demapper DM.

The demodulating part DEM' and the time division demultiplex means TDD' are serial connected between an input IR' and an output OR' of the receiver R. An output of the time division demultiplex control unit RCU' is connected to a control input of the time division demultiplex unit TDD'.

Between an input and an output of the demodulating part DEM', a cascade connection of the time domain equalizer TEQ, the serial to parallel converter SPC, the fast fourier transform processing unit FFTU and the demapper DM is coupled.

Discrete multitone symbols, modulated on a set of carriers with equidistant frequencies and applied to the receiver R via the input IR', are applied to the time domain equalizer TEQ which is in fact an adaptive digital filter dedicated to compensate impulse response effects of the transmission medium. This digital filter is shaped after measurement of the impulse response characteristic of the transmission medium, which is represented by TM in FIG. 1. This measurement is performed at initialisation of the transmission system TS and is executed for the worst case, i.e. the most remote transmitter seen from the receiver DMT-R. Afterwards, the shape of the digital filter is designed so as to reduce the length of this worst case impulse response characteristic to an acceptable number of samples.

The in time domain processed discrete multitone symbols additionally are supplied to the serial to parallel converter SPC which generates a parallel bit stream and applies this stream to the fast fourier transform processing unit FFTU to be transformed from time domain into frequency domain.

Once the frequency domain representation is obtained, a correction of amplitude and phase for each frequency component or carrier is executed by the frequency domain equalizer FEQ. Indeed, frequency dependent amplitude and phase distortion caused by the transmission medium affects the amplitude and phase of each carrier. If the frequency dependent amplitude and phase distortion of the transmission medium are known, the original amplitude and phase of each carrier can be regained. The above cited distortion characteristics of the transmission medium are measured at initialization of the transmission system. The frequency equalizer FEQ, which is in fact also an adaptive digital filter, then can be adapted to compensate the frequency dependent distortion of the transmission medium.

Finally, the demapper DM, knowing the modulation methods used to modulate each carrier, recovers the transmitted databits by demodulating the set of carriers.

It is to be noted that carriers of the above mentioned set of carriers with equidistant frequencies, which are modulated by different transmitters, are generated by different carrier generators (not shown), as a result of which a perfectly equidistant set of carrier frequencies cannot be obtained. Due to this limitation, small frequency interference effects will appear in the received discrete multitone symbols. Consequently, compared with the known point to point discrete multitone applications, the signal to noise ratio of the present transmission system TS would be lower. To remedy this disadvantage, the clocks are designed in such a way that the frequencies of the distinct transmitters T1 . . . Tn match within a specified range.

Referring to FIG. 1 it is further to be noted that the time division multiplex means TDM and the modulating part MOD in the transmitters T1 . . . Tn may be interchanged. Correspondingly, in the receiver DMT-R, the demodulating part DEM and the time division demultiplex means TDD may be interchanged. If the transmitters T1 . . . Tn are not allowed to use carriers with equal frequencies, the time division multiplex and demultiplex means, TDM and TDD, and their respective control units, TCU and RCU, can be omitted.

It should be mentioned also that a central controller might be included in the transmission system TS of FIG. 1 to coordinate the upstream transmission in the transmission medium TM, i.e. the transmission from the transmitters T1 . . . Tn to the receiver DMT-R. Such a central controller therefore transmits polling signals to the distinct transmitters T1 . . . Tn, thereby enabling these transmitters T1 . . . Tn to supply their modulated carriers via their time division multiplex means TDM or respective delay units DU1 . . . DUn to the transmission medium TM.

It is finally also noted here that the mentioned multipoint to point transmission medium TM should not necessarily be a star-shaped transmission line as is shown in FIG. 1. It might for example be based on a bus configuration. Furthermore, it can be constituted by electrical transmission lines as well as by optical waveguides.

While the principles of the invention have been described above in connection with specific apparatus, it is to be clearly understood that this description is made only by way of example and not as a limitation on the scope of the invention.

We claim:

1. A frequency division multiple access (FDMA) dedicated transmission system (TS) including
 a plurality of transmitters (T1, T2, . . . , Ti, . . . Tn),
 a multipoint to point transmission medium (TM), and
 a receiver (DMT-R) located at respective distances from said transmitters, each of said plurality of transmitters (T1, T2, . . . , Ti, . . . Tn) including, between an input (IT) and an output (OT) thereof,
 a modulating part (MOD) being adapted to modulate input data (Di), applied to said transmitter (Ti) via said input (IT), on a subset of carriers, said modulating part (MOD) thereby generating a subset of modulated carriers for application as groups of databits to said transmission medium (TM) via said output (OT),
characterized in that
said modulating part adds, to each group of databits, a number of prefix bits sufficient to prevent interblock interference in said transmission system (TS),
said receiver (DMT-R) is of a discrete multitone type and includes, between an input (IR) and an output (OR) thereof, a demodulating part (DEM), that demodulates discrete multitone symbols (D) modulated on a set of carriers with equidistant frequencies and uses said prefix bits to detect and compensate for propagation delays resulting from any differences among said respective distances between said receiver and said transmitters, and that said modulating part (MOD) of each said transmitter (Ti) modulates said input data (Di) on a predetermined said subset of carriers, which forms part of said set of carriers with equidistant frequencies.

2. A transmission system (TS) according to claim 1, characterized in that each said subset of carriers consists of one single carrier of said set of carriers with equidistant frequencies, so that each said transmitter (Ti) of said plurality of transmitters (T1, T2, . . . , Ti, . . . , Tn) modulates said input data (Di) on a respective said single carrier.

3. A transmission system (TS) according to claim 1, characterized in that each said transmitter (Ti) is additionally equipped with time domain multiplex means (TDM), coupled between said input (IT) and said modulating part (MOD), and with a time domain multiplex control unit (TCU) an output of which is connected to an input of said time domain multiplex means (TDM), said time domain multiplex means (TDM) enabling, under the control of said time domain multiplex control unit (TCU), different transmitters of said plurality of transmitters (T1, T2, . . . , Ti, . . . , Tn) to modulate in different time slots, carriers with equal frequencies, and that said receiver (DMT-R) is additionally equipped with time domain demultiplex means (TDD), coupled between said demodulating part (DEM) and said output (OR), and with a time domain demultiplex control unit (RCU) an output of which is connected to an input of said time domain demultiplex means (TDD), said time domain demultiplex means (TDD) enabling, under the control of said time domain demultiplex control unit (RCU) to time domain demultiplex data, modulated on said carriers with equal frequencies by said different transmitters and transmitted in said different time slots.

4. A transmission system (TS) according to claim 1, characterized in that said transmission system (TS) additionally includes a plurality of delay units (DU1, DU2, . . . , DUi, . . . , DUn) each of which is coupled between a respective one of said plurality of transmitters (T1, T2, . . . , Ti, . . . , Tn) and said transmission medium (TM), said delay units (DU1, DU2, . . . , DUi, . . . , DUn) delaying transmission of said modulated carriers.

5. A transmitter (T), for use in a frequency division multiple access (FDMA) dedicated multipoint to point transmission system (TS), said transmitter (T) including, between an input (IT') and an output (OT') thereof,
 a modulating part (MOD') to modulate data bits (DB) of a data bit stream on a predetermined subset of carriers, characterized in that said subset of carriers forms part of a set of carriers with equidistant frequencies, and that said modulating part, coupled between an input and an output thereof, includes a cascade connection of
- a mapper (M),
- an inverse Fast Fourier Transform processing unit (IFFTU),
- a cyclic prefix adder (CPA), adding a number of prefix bits sufficient to prevent interblock interference, and
- a parallel to serial converter (PSC), said mapper (M) grouping said data bits (DB) according to predefined modulation methods for each carrier of said subset of carriers, thereby producing subgroups of data bits, and modulating each of said carriers with a respective one of said subgroups of data bits, thereby generating a subset of modulated carriers, said inverse Fast Fourier Transform processing unit (IFFTU) transforming said subset of modulated carriers from frequency domain to time domain and applying said subset of modulated carriers, transformed to the time domain, to said parallel to serial converter (PSC) to be converted into a serial data stream for application to said output (OT').

6. A transmitter (T) according to claim 5 characterized in that said modulating part (MOD') includes said cyclic prefix adder (CPA), coupled between said inverse fast fourier transform processing unit (IFFTU) and said parallel to serial converter (PSC) so as to add a number of prefix bits to said subset of modulated carriers transformed to the time domain, said number of prefix bits being determined in such a way as to prevent said transmission system (TS) from interblock interference.

7. A transmitter (T) according to claim 6, characterized in that said number of prefix bits is enlarged with respect to said number of prefix bits determined to prevent said transmission system (TS) from interblock interference, thereby avoiding synchronization problems.

8. A receiver for use in a frequency division multiple access (FDMA) dedicated multipoint to point transmission system (TS), said receiver (R) including, between an input (IR') and an output (OR') thereof,
- a demodulating part (DEM') to demodulate data modulated on a set of carriers by a plurality of transmitters (T1, T2, ... Ti, ... Tn), located at respective distances from said receiver, and applied to said receiver via multipoint to point transmission medium (TM), characterized in that said data are modulated on said set of carriers with equidistant frequencies, along with sufficient additional bits for compensation of propagation delays due to any differences among said respective distances, and that said demodulating part (DEM'), between an input and an output thereof, includes a cascade connection of
- a time domain equalizer (TEQ),
- a serial to parallel converter (SPC),
- a Fast Fourier Transform processing unit (FFTU),
- a frequency domain equalizer (FEQ) and a demapper (DM), said time domain equalizer (TEQ) compensating for impulse response effects of said transmission medium (TM) by digital filtering, said serial to parallel converter (SPC) generating a parallel bit stream and applying said bit stream to said Fast Fourier Transform processing unit (FFTU) to be transformed from time domain to frequency domain, said frequency domain equalizer (FEQ) being adapted to compensate frequency-dependent amplitude and phase distortion of said transmission medium (TM) also by digital filtering and said demapper (DM) being adapted to retrieve said data from said set of modulated carriers according to predefined modulation methods for each carrier of said set of modulated carriers.

\* \* \* \* \*